United States Patent
Li (10) Patent No.: US 10,515,254 B2
(45) Date of Patent: Dec. 24, 2019

(54) METHOD AND APPARATUS FOR ACQUIRING FINGERPRINT, CHIP AND TERMINAL DEVICE

(71) Applicant: SHENZHEN GOODIX TECHNOLOGY CO., LTD., Shenzhen (CN)

(72) Inventor: Yanzhao Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 112 days.

(21) Appl. No.: 15/730,707

(22) Filed: Oct. 11, 2017

(65) Prior Publication Data

US 2019/0012517 A1  Jan. 10, 2019

Related U.S. Application Data

(63) Continuation of application No. PCT/CN2017/091907, filed on Jul. 5, 2017.

(51) Int. Cl.
*G06K 9/00* (2006.01)

(52) U.S. Cl.
CPC ..... *G06K 9/00087* (2013.01); *G06K 9/00053* (2013.01); *G06K 9/00114* (2013.01); *G06K 2009/0006* (2013.01)

(58) Field of Classification Search
CPC ............. G06K 9/0004; G06K 9/00053; G06K 9/00087; G06K 9/00114; G06K 9/40; G06K 2009/0006
See application file for complete search history.

(56) References Cited

U.S. PATENT DOCUMENTS

| 8,582,838 B1 * | 11/2013 | McCormick ......... G07D 7/2033 382/124 |
| 9,152,839 B2 | 10/2015 | Yi et al. |
| 2002/0039137 A1 * | 4/2002 | Harper ............... G06K 7/10722 348/207.99 |

(Continued)

FOREIGN PATENT DOCUMENTS

| CN | 105654027 A | 6/2016 |
| CN | 106203326 A | 12/2016 |

(Continued)

*Primary Examiner* — Amara Abdi (57) ABSTRACT

Embodiments of the present application provide a method and an apparatus for acquiring a fingerprint, a chip and a terminal device, which may reduce interference caused by ambient light, temperature and a chip dark current and other factors. The method includes: acquiring a first fingerprint image and at least one second fingerprint image, where a screen luminance for acquiring the first fingerprint image is higher than a screen luminance for acquiring the at least one second fingerprint image; determining a third fingerprint image according to the first fingerprint image and the at least one second fingerprint image, where the third fingerprint image is an interference image having a same exposure time as the first fingerprint image; and performing interference cancellation on the first fingerprint image according to the third fingerprint image to obtain a fourth fingerprint image.

20 Claims, 5 Drawing Sheets

100

A first fingerprint image and at least one second fingerprint image are acquired, where a screen luminance for acquiring the first fingerprint image is higher than a screen luminance for acquiring the at least one second fingerprint image — S101

A third fingerprint image is determined according to the first fingerprint image and the at least one second fingerprint image, where the third fingerprint image is an interference image having a same exposure time as the first fingerprint image — S102 interference cancellation is performed on the first fingerprint image according to the third fingerprint image to obtain a fourth fingerprint image — S103

(56) References Cited

U.S. PATENT DOCUMENTS

| | | | |
|---|---|---|---|
| 2005/0105785 A1* | 5/2005 | Shigeta | G06K 9/0004 382/124 |
| 2007/0013646 A1* | 1/2007 | Harada | G06F 3/0421 345/102 |
| 2010/0103151 A1 | 4/2010 | Harada | |
| 2012/0127296 A1* | 5/2012 | Oguchi | A61B 5/1172 348/77 |
| 2014/0286544 A1 | 9/2014 | Yi et al. | |
| 2014/0375821 A1* | 12/2014 | Wu | G06K 9/00355 348/164 |
| 2015/0244916 A1* | 8/2015 | Kang | H04N 5/2355 348/222.1 |
| 2015/0346897 A1 | 12/2015 | Irri et al. | |
| 2016/0042219 A1* | 2/2016 | Bae | G06K 9/00013 382/124 |
| 2017/0061191 A1 | 3/2017 | Naruse et al. | |

FOREIGN PATENT DOCUMENTS

| | | |
|---|---|---|
| CN | 106446775 A | 2/2017 |
| CN | 106485237 A | 3/2017 |
| JP | 2004511015 A | 4/2004 |
| KR | 20050048511 A | 5/2005 |

\* cited by examiner

S101 — A first fingerprint image and at least one second fingerprint image are acquired, where a screen luminance for acquiring the first fingerprint image is higher than a screen luminance for acquiring the at least one second fingerprint image S102 — A third fingerprint image is determined according to the first fingerprint image and the at least one second fingerprint image, where the third fingerprint image is an interference image having a same exposure time as the first fingerprint image S103 — interference cancellation is performed on the first fingerprint image according to the third fingerprint image to obtain a fourth fingerprint image

METHOD AND APPARATUS FOR ACQUIRING FINGERPRINT, CHIP AND TERMINAL DEVICE

CROSS-REFERENCE TO RELATED APPLICATIONS

The present application is a continuation of international application No. PCT/CN2017/091907, filed on Jul. 5, 2017, which is hereby incorporated by reference in its entirety.

TECHNICAL FIELD

The present application relates to the technical field of the optical fingerprint, and more particularly to a method and an apparatus for acquiring a fingerprint, a chip and a terminal device.

BACKGROUND

In an optical fingerprint system, due to interference of ambient light, chip dark current, temperature and other factors, the fingerprint imaging performance is significantly affected, and thus the stability and security of the optical fingerprint system are seriously affected.

At present, in order to enhance an anti-interference ability of the optical fingerprint system, the major solutions include optimizing a chip design to reduce an impact of the chip dark current; or, obtaining an impact of these external interference in a typical environment, and then performing calibration in actual imaging; or, designing a dark background light path.

However, these methods may only reduce the impact caused by some of interference factors, for example, optimizing the chip design may only reduce the impact of the chip dark current, but may not reduce the impact of the ambient light; if calibration is performed on actual fingerprint image according to the impact of the external interference in the typical environment, inaccurate calibration may occur for scenarios that differ a lot from the typical environment.

Therefore, a method for acquiring a fingerprint, which is capable of reducing the interference of the ambient light, chip dark current, temperature or other factors on the fingerprint image, is needed.

SUMMARY

Embodiments of the present application provide a method and an apparatus for acquiring a fingerprint, a chip and a terminal device, which are conducive to reducing interference of ambient light, a chip dark current, temperature or other factors on the fingerprint image.

In a first aspect, a method for acquiring a fingerprint is provided, including:

acquiring a first fingerprint image and at least one second fingerprint image, where a screen luminance for acquiring the first fingerprint image is higher than a screen luminance for acquiring the at least one second fingerprint image;

determining a third fingerprint image according to the first fingerprint image and the at least one second fingerprint image, where the third fingerprint image is an interference image having a same exposure time as the first fingerprint image; and performing interference cancellation on the first fingerprint image according to the third fingerprint image to obtain a fourth fingerprint image.

The time difference between the acquisition of the first fingerprint image and that of the at least one second fingerprint image is so small that it may be considered that interference factors of ambient light, temperature and chip dark current at the time of acquiring the first fingerprint image and those at the time of acquiring the at least one second fingerprint image are the same or similar. Accordingly, the third fingerprint image determined according to the at least one second fingerprint image has same or similar interference factors as the first fingerprint image. Moreover, since the third fingerprint image and the first fingerprint image have the same exposure time, a deviation caused by exposure difference is further cancelled. Therefore, the interference cancellation performed on the first fingerprint image according to the third fingerprint image is conducive to reducing the interference caused by the ambient light, chip dark current, temperature and other factors, such that the stability of the optical fingerprint system may be improved.

Since the fourth fingerprint image after interference removal is closer to a real fingerprint image with respect to the first fingerprint image, operations such as the fingerprint identification or fingerprint verification are performed according to the fourth fingerprint image, such that the security of the optical fingerprint system may be improved.

Optionally, the order for acquiring the first fingerprint image and the at least one second fingerprint image is not particularly limited in the embodiments of the present application. For instance, the first fingerprint image may be acquired first; or, the at least one second fingerprint image may also be acquired first.

Optionally, an exposure parameter for acquiring the first fingerprint image and an exposure parameter for acquiring the at least one second fingerprint image may be the same or different, and it is not particularly limited in the embodiments of the present application.

Further, the exposure parameters of the at least one second fingerprint image may be the same or different, i.e., the at least one second fingerprint image may be acquired by adopting a same exposure time, or, the at least one second fingerprint image may also be acquired by adopting different exposure times.

With reference to the first aspect, in certain implementation manners of the first aspect, the acquiring the first fingerprint image and the at least one second fingerprint image includes:

acquiring the first fingerprint image under a first exposure parameter; and acquiring the at least one second fingerprint image under a second exposure parameter;

where the first exposure parameter includes a first exposure time, and the second exposure parameter includes a second exposure time.

With reference to the first aspect, in certain implementation manners of the first aspect, the determining the third fingerprint image according to the first fingerprint image and the at least one second fingerprint image includes:

averaging the at least one second fingerprint image to obtain a fifth fingerprint image; and determining the third fingerprint image according to exposure parameters of the first fingerprint image and the fifth fingerprint image.

With reference to the first aspect, in certain implementation manners of the first aspect, the determining the third fingerprint image according to the exposure parameters of the first fingerprint image and the fifth fingerprint image includes:

determining the fifth fingerprint image as the third fingerprint image if the first exposure time and the second exposure time are the same; or determining a fingerprint image obtained by multiplying the fifth fingerprint image by a calibration factor and subtracting a specific offset image as the third fingerprint image if the first exposure time and the second exposure time are different, where the calibration factor is determined according to the first exposure parameter and the second exposure parameter.

Optionally, a pixel value of each pixel point in the specific offset image is zero.

That is, a fingerprint image obtained by multiplying the fifth fingerprint image by the calibration factor may be determined as the third fingerprint image.

Optionally, the calibration factor is a ratio between the first exposure time and the second exposure time.

Optionally, in an embodiment of the present application, in the case that the first exposure time and the second exposure time are the same, any one of fingerprint images in the at least one second fingerprint image may also be determined as the third fingerprint image; alternatively, a fingerprint image obtained by averaging some of fingerprint images in the at least one second fingerprint image is determined as the third fingerprint image, or the like;

Or in the case that the first exposure time and the second exposure time are different, a fingerprint image obtained by multiplying any one of fingerprint images in the at least one second fingerprint image by a calibration factor may also be determined as an interference image of the first fingerprint image, or the like.

With reference to the first aspect, in certain implementation manners of the first aspect, the acquiring the first fingerprint image and the at least one second fingerprint image includes:

acquiring the first fingerprint image under a first exposure parameter; and acquiring the at least one second fingerprint image under at least one second exposure parameter;

where each of the at least one second exposure parameter is corresponds to a respective one of the at least one second fingerprint image.

With reference to the first aspect, in certain implementation manners of the first aspect, the determining the third fingerprint image according to the first fingerprint image and the at least one second fingerprint image includes:

performing an interpolating or fitting process on the at least one second fingerprint image to obtain the third fingerprint image having the same exposure time as the first fingerprint image.

With reference to the first aspect, in certain implementation manners of the first aspect, the at least one second fingerprint image includes a second fingerprint image, and the determining the third fingerprint image according to the first fingerprint image and the at least one second fingerprint image includes:

determining the second fingerprint image as the third fingerprint image if the first fingerprint image and the second fingerprint image have a same exposure time; or determining a fingerprint image obtained by multiplying the second fingerprint image by a calibration factor and subtracting a specific offset image as the third fingerprint image if the first fingerprint image and the second fingerprint image have a different exposure time, where the calibration factor is determined according to the exposure parameters of the first fingerprint image and the second fingerprint image.

With reference to the first aspect, in certain implementation manners of the first aspect, the method further includes:

identifying a fingerprint, measuring a humidity, or dividing a pressed area according to the fourth fingerprint image.

Since the fourth fingerprint image is a fingerprint image that removes the interference image, i.e., the fourth fingerprint image is not affected by the ambient light, dark current, temperature and other factors, identifying the fingerprint, measuring the humidity, or dividing the pressed area according to the fourth fingerprint image are conducive to improving the accuracy and security of the optical fingerprint system.

Therefore, in the method for acquiring the fingerprint of the embodiment of the present application, under a same interference condition, a bright screen image and at least one dimmed screen image are acquired, and an interference image having a same exposure time as the bright screen image is determined according to the at least one dimmed screen image; since the first fingerprint image and the interference image include a same or similar interference image component, performing interference cancellation on the bright screen image according to the interference image is conducive to reducing the effect of the ambient light, dark current, temperature and other factors on the fingerprint image.

In a second aspect, an apparatus for acquiring a fingerprint is provided. The apparatus includes functional modules for executing the method in the above-mentioned first aspect or any possible implementation manners of the first aspect.

In a third aspect, a chip is provided. The chip includes an input/output interface, at least one processor, at least one memory and a bus. The at least one memory is configured to store an instruction. The at least one processor is configured to call the instruction in the at least one memory, to execute the method in the first aspect or any possible implementation manners of the first aspect.

In a fourth aspect, a terminal device is provided, including a fingerprint acquisition module and a processor. The processor and the fingerprint acquisition module communicate with each other through an internal connection path, to transfer control and/or data signals, such that the terminal device executes the method in the above-mentioned first aspect or any possible implementation manners of the first aspect.

In a fifth aspect, a computer readable medium for storing a computer program is provided. The computer program includes an instruction for executing the above-mentioned first aspect or any possible implementation manners of the first aspect.

In a sixth aspect, a computer program product including an instruction is provided. At the time of running the instruction of the computer program product, the computer executes the method for acquiring the fingerprint in the above-mentioned first aspect or any possible implementation manners of the first aspect.

In particular, the computer program product may be run on the terminal device of the above-mentioned fourth aspect.

DESCRIPTION OF EMBODIMENTS

A description of technical solutions of the embodiments of the present application will be given below, in combination with the accompanying drawings.

It should be understood that, the embodiments of the present application may be applied to an optical fingerprint system including, but not limited to an optical fingerprint identification system and a medical diagnosis product based on optical fingerprint imaging. The embodiments of the present application are merely described by taking the optical fingerprint system as an example, and it should not intended to impose any limitation on the present application. The embodiments of the present application are also applicable to another system adopting the optical imaging technology or the like.

As a common application scenario, the optical fingerprint system provided in the embodiments of the present application may be applied to a smart phone, a tablet computer, and another mobile terminal having a display screen or another terminal device; more particularly, in the above-mentioned terminal device, an apparatus for acquiring a fingerprint may specifically be an optical fingerprint apparatus, and it may be disposed in part of an area or an overall area below the display screen, so as to form an under-display optical fingerprint system.

Figure 1:
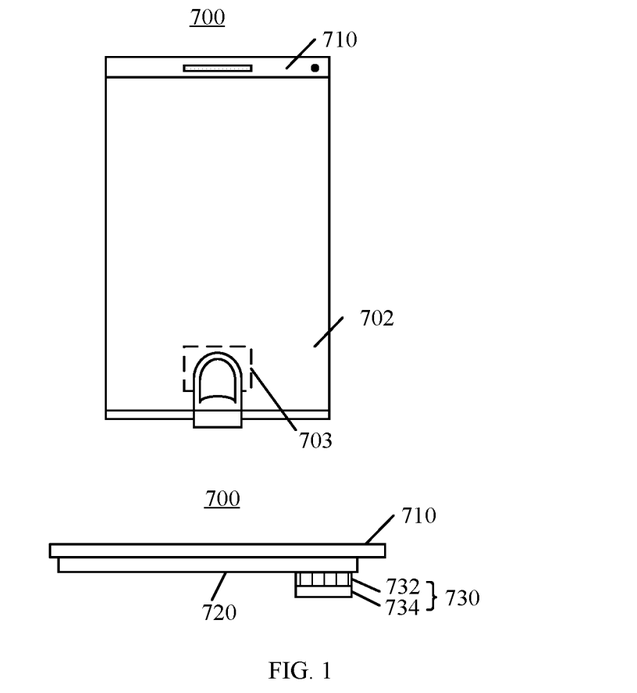
FIG. 1 is a structural schematic view of a terminal device in an embodiment of the present application.

FIG. 1 is a structural schematic view of a terminal device to which an embodiment of the present application may be applied. The terminal device 700 includes a display screen 720 and an optical fingerprint apparatus 730; the optical fingerprint apparatus 730 is disposed in part of an area below the display screen 720. The optical fingerprint apparatus 730 includes a sensing array having a plurality of optical sensing units, and an area where the sensing array is located is defined as a fingerprint detection area 703 of the optical fingerprint apparatus 730. As shown in FIG. 1, the fingerprint detection area 703 is located in a display area 702 of the display screen 720. With this configuration, when the user needs to unlock the terminal device or perform other fingerprint verification on the terminal device, the fingerprint input may be implemented by pressing the finger on the fingerprint detection area 703 in the display screen 720. Since the fingerprint detection may be realized within the screen, it is not necessary for the terminal device 700 with the above-mentioned structure to particularly reserve a space on a front thereof for arrangement of a fingerprint key (such as a Home key). As such, a full screen solution may be adopted, i.e., the display area 702 of the display screen 720 may be substantially extended to an entire t front of the terminal device 700.

As a preferred embodiment, the display screen 720 may adopt a display screen having self-luminous display units, such as an organic light-emitting diode (OLED) display screen or a micro-LED display screen. By adopting the OLED display screen as an example, the optical fingerprint apparatus 730 may utilize display units (i.e., OLED light sources) of the OLED display screen 720, which are located in the fingerprint detection area 703, as an excitation light source for the optical fingerprint detection. Moreover, the sensing array of the optical fingerprint apparatus 730 is in particular a photo detector array including a plurality of photo detectors distributed as an array, and the photo detectors may serve as the optical sensing unit as mentioned above. When a finger presses the fingerprint detection area 703, light emitted from the display units of the fingerprint detection area 703 is reflected on the fingerprint of the surface of the finger and forms reflected light; reflected light at ridges and valleys of the fingerprint is different, and the reflected light returns to the display screen 720 and is received by the photo detector array and converted into a corresponding electrical signal, i.e., a fingerprint detection signal. Fingerprint image data may be obtained based on the fingerprint detection signal, and the fingerprint matching verification may be further performed, such that the optical fingerprint identification function is realized in the terminal device 700.

It should be understood that, on specific implementation, the terminal device 700 further includes a transparent protective cover plate 710 which may be a glass cover plate or a sapphire cover plate; the transparent protective plate 710 is arranged above the display screen 720 and covers the front of the terminal device 700. Because, in the embodiment of the present application, the so-called finger pressing on the display screen 720 actually refers to pressing on the cover plate 710 over the display screen 720 or a protective layer surface covering the cover plate 710.

As an optional implementation manner, as shown in FIG. 1, the optical fingerprint apparatus 730 includes a light detecting section 734 and an optical assembly 732. The light detecting section 734 includes the sensing array as well as a readout circuit and other auxiliary circuits electrically connected with the sensing array; the light detecting section 734 can be formed as a die via a semiconductor process. The optical assembly 732 may be arranged above the sensing array of the light detecting section 734, and may specifically include a filter, a light guide layer, and other optical elements. The filter may be configured to filter out the ambient light that penetrates the finger, and the light guide layer is mainly configured to guide the reflected light reflected from the surface of the finger to the sensing array for optical detection.

On specific implementation, the optical assembly 732 may be packaged with the light detecting section 134 in a same optical fingerprint chip; the light guide layer may specifically be a collimator layer or a lens layer made of a semiconductor silicon wafer, which includes a plurality of collimating units and lens units. The collimating unit may specifically be a small hole; in the reflected light reflected from the finger, light vertically incident on the collimating units may pass through and be received by the optical sensing units there beneath respectively, while light obliquely incident is attenuated via multiple reflections within the collimating units. Therefore, each optical sensing unit may substantially only receive reflected light reflected from a fingerprint pattern just above, such that a fingerprint image of the finger may be detected by the sensing array.

In the optical fingerprint apparatus 730, each collimating unit or lens unit may correspond to one of optical sensing units of the sensing array, respectively; alternatively, the collimating unit or lens unit may not be in one-to-one correspondence to the optical sensing unit of the sensing array to reduce the generation of moire fringes. For instance, one optical sensing unit may correspond to a plurality of collimating units or lens units. Alternatively, the collimating unit or lens unit may be arranged in an irregular arrangement with respect to the optical sensing units; the reflected light detected by each sensing unit may be corrected via a post software algorithm when the collimating units or lens units are arranged irregularly.

In another alternative implementation manner, the display screen 720 may also use a non-self-luminous display screen, such as a liquid crystal display screen using backlight. In this case, the optical fingerprint apparatus 730 may not use the display units of the display screen 720 as an excitation light source, and thus an excitation light source needs to be integrated inside the optical fingerprint apparatus 730 or arrange outside the optical fingerprint apparatus 730, so as to realize the optical fingerprint detection. The detection principle thereof is consistent with the content described above.

Before introducing a method for acquiring a fingerprint in an embodiment of the present application, the technique relating to the embodiment of the present application will be described first.

A fingerprint image of the finger acquired by an apparatus for acquiring a fingerprint, such as the optical fingerprint apparatus 730 as shown in FIG. 1, mainly includes the following image components:

1. an image component 1 acquired by the apparatus for acquiring the fingerprint from a light signal which is emitted by an excitation light source and directly passes through an optical imaging path without being reflected by the finger;

2. an image component 2 acquired by the apparatus for acquiring the fingerprint from a light signal which is emitted by the excitation light source and passes through the optical imaging path after being reflected by the finger;

3. an image component 3 acquired by the apparatus for acquiring the fingerprint from ambient light which passes through the optical imaging path;

4. an image component 4 which is generated by a chip dark current.

The image component 1 is a local image component formed by the excitation light source; the image component 2 is an image component including fingerprint information; the image components 3 and 4 are interference images and may vary according to the change of the use environment, use frequency, the finger, pressing area or other factors.

It may be seen from the above that neither the chip design optimizing, or calibrating via calibration parameters in the typical environment can effectively eliminate the interference of the ambient light, chip dark current, temperature and other factors.

In view of this, a method for acquiring a fingerprint is provided in an embodiment of the present application, which is conducive to reducing interference of ambient light, chip dark current, temperature or other factors on a fingerprint image.

Figure 2:
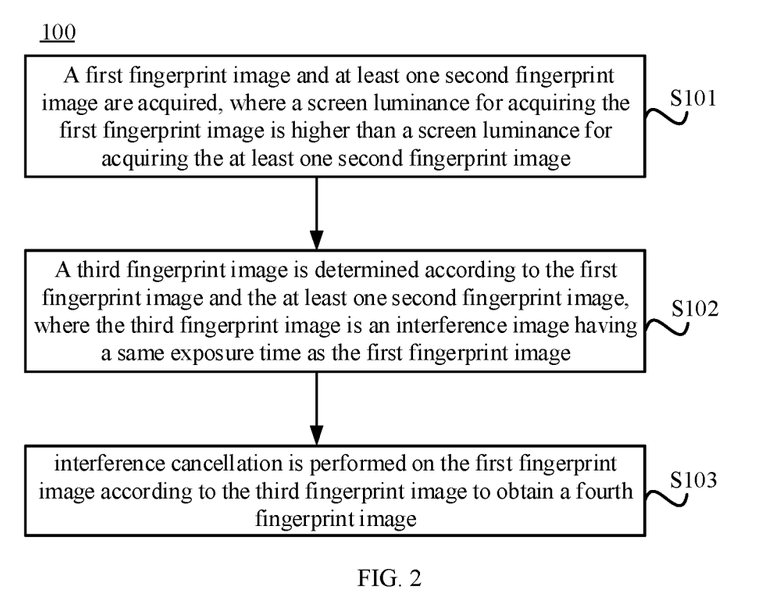
FIG. 2 is a schematic flowchart of a method for acquiring a fingerprint according to an embodiment of the present application.

FIG. 2 is a schematic flowchart of a method 100 for acquiring a fingerprint according to an embodiment of the present application. As shown in FIG. 2, the method 100 includes the following contents:

S101, a first fingerprint image and at least one second fingerprint image are acquired, where a screen luminance for acquiring the first fingerprint image is higher than a screen luminance for acquiring the at least one second fingerprint image.

In other words, in the embodiment of the present application, a luminance of an excitation light source at the time of acquiring the first fingerprint image is higher than a luminance of the excitation light source at the time of acquiring the at least one second fingerprint image, or the excitation light source may be in an extinguished state at the time of acquiring the at least one second fingerprint image.

In here, the first fingerprint image may also be referred to as a bright screen image, and the at least one second fingerprint image may also be referred to as a dimmed screen image; i.e., the first fingerprint image is a fingerprint image acquired in the case of a bright screen, and the at least one second fingerprint image is a fingerprint image in the case of a dimmed screen or an extinguished screen.

It should be understood that, in the embodiment of the present application, the first fingerprint image may be acquired first, or the at least one second fingerprint image may be acquired first; the order of acquiring the first fingerprint image and the at least one second fingerprint image is not particularly limited in the embodiment of the present application.

For instance, an exposure parameter may be set as a first exposure parameter first, and the first fingerprint image is acquired under the first exposure parameter; alternatively, the exposure parameter may also be set as a second exposure parameter first, and the at least one second fingerprint image is acquired under the second exposure parameter. In other embodiments, the at least one second fingerprint image may alternatively correspond to different exposure parameters, and the at least one second fingerprint image is acquired under the different exposure parameters.

It should be understood that, in the embodiment of the present application, the exposure parameter for acquiring the fingerprint image may be one or more parameter, for example, the exposure parameter may include an exposure time, or it may also include another exposure parameter. The embodiments of the present application are mainly introduced by taking the exposure parameter including the exposure time as an example below, but it should not intended to impose any limitation on the embodiment of the present application; in the embodiment of the present application, the dimmed screen image may be calibrated according to another exposure parameter, to obtain an interference image.

Optionally, in an embodiment of the present application, an exposure time corresponding to the first fingerprint image and an exposure time corresponding to the at least one second fingerprint image may be the same, i.e. the first fingerprint image and the at least one second fingerprint image may be acquired by adopting a same exposure time; or may be different. The exposure time corresponding to the at least one second fingerprint image may be the same or different, i.e., the at least one second fingerprint image may be acquired by adopting a same exposure time, or the at least one second fingerprint image may be acquired by adopting different exposure times, and it is not particularly limited in the embodiment of the present application.

The time difference between the acquisition of the first fingerprint image and that of the at least one second fingerprint image is so small that it may be considered that interference factors of ambient light, temperature and chip dark current at the time of acquiring the first fingerprint image and those at the time of acquiring the at least one second fingerprint image are the same or similar. Therefore, an interference image of the first fingerprint image under the current interference condition may be determined according to the at least one second fingerprint image; and the interference cancellation on the first fingerprint image may then be performed according to the interference image, which is able to effectively reduce interference caused by the ambient light, temperature, chip dark current and other factors.

S102, a third fingerprint image is determined according to the first fingerprint image and the at least one second fingerprint image, the third fingerprint image is an interference image having a same exposure time as the first fingerprint image; and S103, interference cancellation is performed on the first fingerprint image according to the third fingerprint image to obtain a fourth fingerprint image.

It may be seen from the description of S101 that, since an interference factor for acquiring the first fingerprint image and that for acquiring the at least one second fingerprint image are the same or similar, an interference image of the first fingerprint image, i.e., a third fingerprint image, may be determined according to the at least one second fingerprint image, and then interference cancellation is performed on the first fingerprint image according to the third fingerprint image to obtain a fourth fingerprint image after interference removal.

Considering that an exposure parameter for acquiring the at least one second fingerprint image and an exposure parameter for acquiring the first fingerprint image may be inconsistent, the at least one second fingerprint image may be calibrated according to a difference of exposure parameters, to determine an interference image having a same exposure parameter as the first fingerprint image, i.e., a third fingerprint image. The third fingerprint image obtained after the calibration eliminates a deviation caused by an exposure difference; and accordingly, the third fingerprint image and the first fingerprint image may be considered as including the same or similar image component 3 and image component 4, while the third fingerprint image does not include or includes little image component 2. Therefore, the interference cancellation performed on the first fingerprint image according to the third fingerprint image is able to reduce the interference caused by the ambient light, chip dark current, temperature and other factors, i.e., a fourth fingerprint image after interference removal, is closer to a real fingerprint image.

Therefore, the fingerprint image acquired by the method for acquiring the fingerprint according to the embodiment of the present application is conducive to reducing the interference caused by the ambient light, chip dark current, temperature and other factors, such that the stability of the optical fingerprint system may be improved. Further, since the fourth fingerprint image after interference removal is closer to the real fingerprint image, operations such as the fingerprint identification or fingerprint verification performed according to the fourth fingerprint image, can improve the security of the optical fingerprint system.

Optionally, as an embodiment, step S102 may include:
averaging the at least one second fingerprint image to obtain a fifth fingerprint image; and
determining the third fingerprint image according to exposure parameters of the first fingerprint image and the fifth fingerprint image.

In the present embodiment, the first fingerprint image is acquired using a first exposure parameter, and the at least one second fingerprint image is acquired using a second exposure parameter, i.e., the at least one second fingerprint image is acquired using a same exposure parameter; the first exposure parameter includes a first exposure time, the second exposure parameter includes a second exposure time. The first exposure time and the second exposure time are the same or different.

In this case, the at least one second fingerprint image may be averaged to obtain a fifth fingerprint image having a higher signal to noise ratio, and then the third fingerprint image, i.e., an interference image, is determined according to a difference of exposure parameters of the fifth fingerprint image and the first fingerprint image.

In the embodiment of the present application, determining the third fingerprint image according to the fifth fingerprint image having the high signal to noise ratio is conducive to improving the accuracy and reliability of the determined interference image.

Further, the determining the third fingerprint image according to exposure parameters of the first fingerprint image and the fifth fingerprint image includes:
determining the fifth fingerprint image as the third fingerprint image if the first exposure time and the second exposure time are the same; or
determining a fingerprint image obtained by multiplying the fifth fingerprint image by a calibration factor and subtracting a specific offset image as the third fingerprint image if the first exposure time and the second exposure time are different, where the calibration factor is determined according to the first exposure parameter and the second exposure parameter.

Multiplying the fifth fingerprint image by a calibration factor may be considered to multiply a pixel value of each pixel point in the fifth fingerprint image by the calibration factor; herein, the fifth fingerprint image multiplied by the calibration factor is referred to as a sixth fingerprint image, and then the third fingerprint image is obtained by subtracting a specific offset image from the sixth fingerprint image, i.e., a pixel value of each pixel point in the third fingerprint image is a pixel value by subtracting a pixel value of a corresponding pixel point in the specific offset image from a pixel value of a corresponding pixel point in the sixth fingerprint image.

In other words, multiplying the fifth fingerprint image by the calibration factor is to scale the pixel value of each pixel point in the fifth fingerprint image in the same proportion; subtracting the specific offset image from the sixth fingerprint image is to perform a specific offset on the pixel value of each pixel point in the sixth fingerprint image; each pixel point may have a same or different offset.

Optionally, in an embodiment of the present application, a fingerprint image obtained by subtracting a specific offset image from the fifth fingerprint image and then multiplying a calibration factor may also be determined as the third fingerprint image. To put it simply, it is possible to multiply a first calibration factor first and then offset a first offset image, it is also possible to offset a second offset image first and then multiply a second calibration factor; it is also possible to offset a third offset image first, and then multiply a third calibration factor, and finally offset a fourth offset image. A processing procedure of the fifth fingerprint image is not particularly limited in the embodiment of the present application, each offset image and each calibration factor may be determined according to exposure parameters of the fifth fingerprint image and the first fingerprint image.

Optionally, the calibration factor may be a ratio between the first exposure time and the second exposure time, or it may be determined according to another exposure parameter in the first exposure parameter and the second exposure parameter, which is not particularly limited by the embodiment of the present application.

In general, the fifth fingerprint image may be determined as an interference image if an exposure time for acquiring the first fingerprint image and an exposure time for acquiring the at least one second fingerprint image are the same; or, the fifth fingerprint image may be calibrated to obtain an interference image having a same exposure time as the first fingerprint image if the exposure time for acquiring the first fingerprint image and the exposure time for acquiring the at least one second fingerprint image are different.

It should be understood that, the above example for determining the third fingerprint image is only a preferred implementation; in the embodiment of the present application, in the case that the first exposure time and the second exposure time are the same, any one of fingerprint images in the at least one second fingerprint image may alternatively be determined as the third fingerprint image; or, a fingerprint image obtained by averaging some of fingerprint images in the at least one second fingerprint image is determined as the third fingerprint image, or the like. In the case that the first exposure time and the second exposure time are different, a fingerprint image obtained by multiplying any one of fingerprint images in the at least one second fingerprint image by a calibration factor may be determined as an interference image of the first fingerprint image, or the like, and it is not particularly limited in the embodiment of the present application.

Optionally, as another embodiment, the S102 may include:

performing an interpolating or fitting process on the at least one second fingerprint image to obtain the third fingerprint image having the same exposure time as the first fingerprint image.

In the present embodiment, the at least one second fingerprint image is acquired by adopting different exposure parameters, that is, the at least one second fingerprint image corresponds to different exposure times, and in such case, the third fingerprint image having the same exposure time as the first fingerprint image may be obtained by adopting an interpolating or fitting process according to the at least one second fingerprint image.

In particular, if the at least one second fingerprint image includes a second fingerprint image, S102 may include:

determining the second fingerprint image as the third fingerprint image if the first fingerprint image and the second fingerprint image have a same exposure time; or determining a fingerprint image obtained by multiplying the second fingerprint image by a calibration factor and subtracting a specific offset image as the third fingerprint image if the first fingerprint image and the second fingerprint image have different exposure time, where the calibration factor is determined according to the exposure parameters of the first fingerprint image and the second fingerprint image.

In such case, the at least one second fingerprint image only includes a second fingerprint image; for instance, the second fingerprint image is a fingerprint image having a long exposure time or a short exposure time, then the third fingerprint image may be determined according to the exposure parameters of the second fingerprint image and the first fingerprint image, and the specific implementation process may refer to the relevant description of the foregoing embodiments.

It should be noted that, the implementation manners for determining the interference image of the first fingerprint image, i.e., the third fingerprint image, illustrated in the embodiments of the present application are only for a better understanding of the embodiments of the present application, which should not intended to impose any limitation on the embodiments of the present application; as long as a first fingerprint image is acquired in the case of a bright screen and at least one second fingerprint image is acquired in the case of a dimmed screen or an extinguished screen, a third fingerprint image having a same exposure time as the first fingerprint image is determined according to the at least one second fingerprint image, and an interference cancellation is performed on the first fingerprint image according to the third fingerprint image to obtain a fourth fingerprint image after interference removal, which all fall into the protection scope of the embodiments of the present application.

Optionally, the performing the interference elimination on the first fingerprint image according to the third fingerprint image to obtain the fourth fingerprint image includes:

determining a difference image obtained by subtracting the third fingerprint image from the first fingerprint image as the fourth fingerprint image.

For example, a pixel value of a corresponding pixel point in the third fingerprint image may be subtracted from a pixel value of each pixel point in the first fingerprint image, and the fourth fingerprint image may be a difference image obtained according to the above-mentioned method, i.e., a pixel value of each pixel point in the fourth fingerprint image is a difference of pixel values of the corresponding pixel points in the first fingerprint image and the third fingerprint image.

The method for acquiring the fingerprint of the embodiment of the present application will be described in detail below with reference to specific examples shown in FIGS. 3 and 4.

Figure 3:
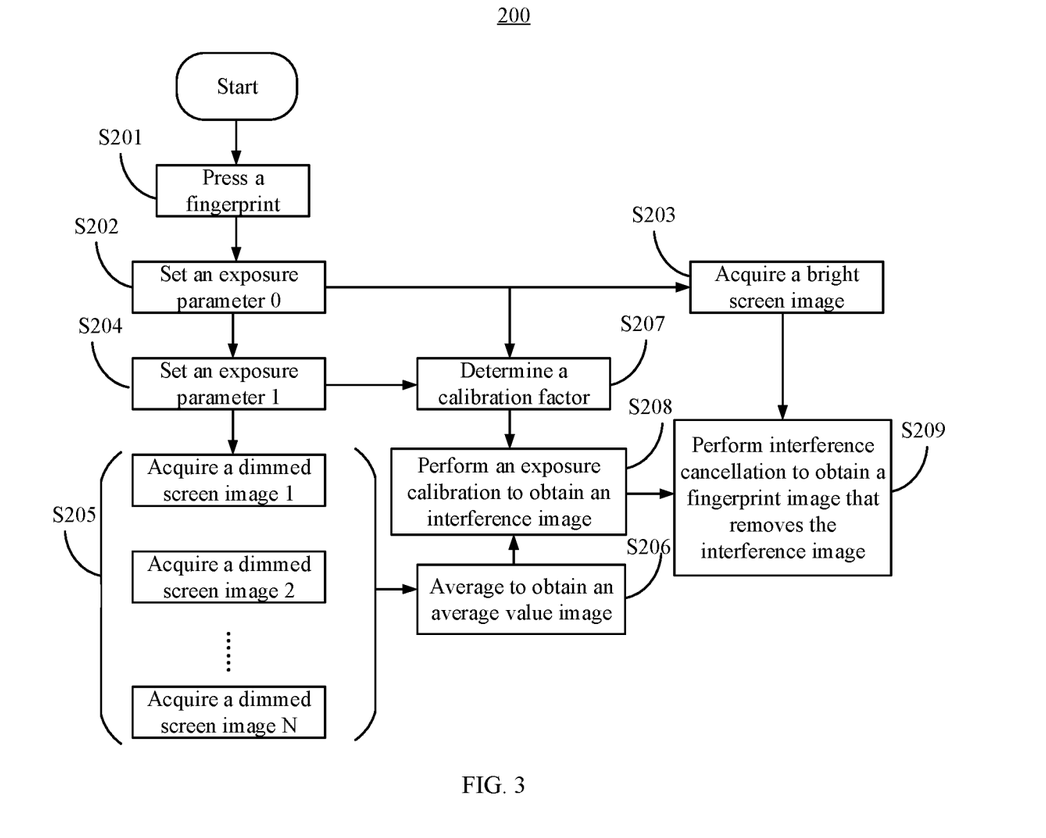
FIG. 3 is a schematic flowchart of a method for acquiring a fingerprint according to one embodiment of the present application.
Figure 4:
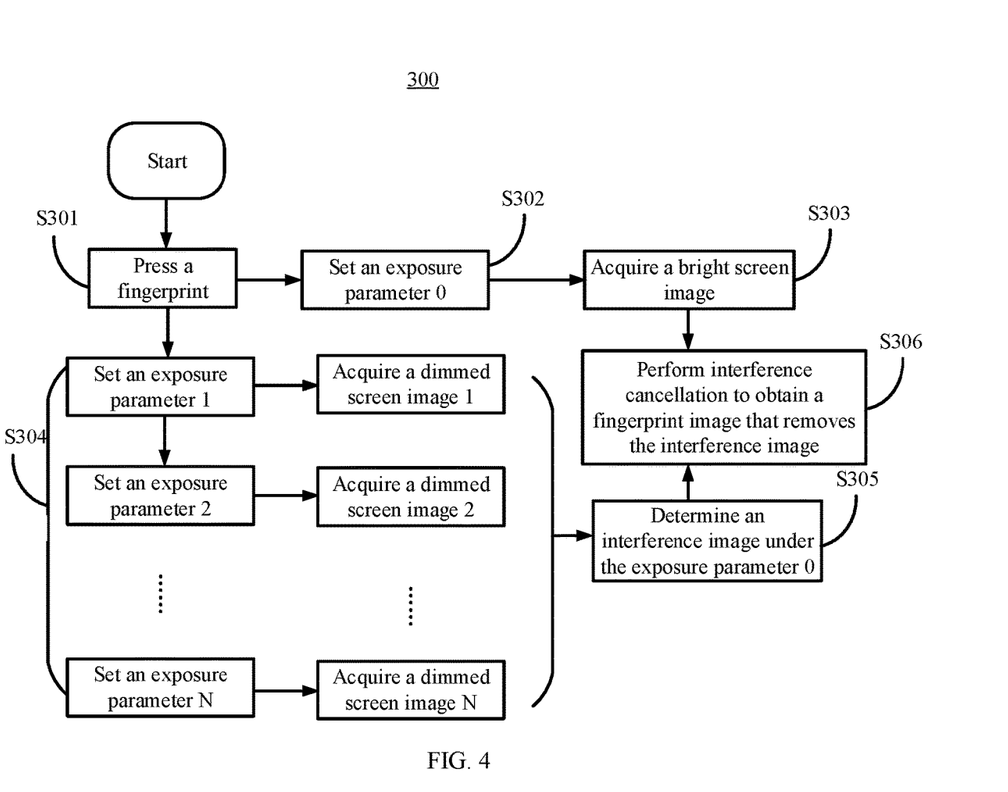
FIG. 4 is a schematic flowchart of a method for acquiring a fingerprint according to another embodiment of the present application.

The distinction between embodiments shown in FIGS. 3 and 4 lies in: in an embodiment shown in FIG. 3, dimmed screen images are acquired under a same exposure parameter, i.e., N dimmed screen images correspond to a same exposure parameter; in an embodiment shown in FIG. 4, N dimmed screen images correspond to different exposure parameters.

It should be understood that, FIGS. 3 and 4 illustrate specific steps or operations of the method for acquiring the fingerprint of the embodiment of the present application; however, these steps or operations are merely examples, and another operation or variants of various operations of FIGS. 3 and 4 may also be executed in the embodiments of the present application. In addition, the steps in FIGS. 3 and 4 may be executed according to an order different from that are presented in FIGS. 3 and 4, respectively, and moreover, it may be unnecessary to implement all of the operations in FIGS. 3 and 4.

As shown in FIG. 3, a method 200 for acquiring a fingerprint may include the following steps:

S201, a human's finger presses a pressed area on an optical imaging system, such as a screen of a cell phone.

S202, an exposure parameter is set as an exposure parameter 0, the exposure parameter 0 may include a first exposure time.

S203, bright screen image acquisition is performed under the exposure parameter 0, i.e., a first fingerprint image is acquired.

An exposure time of the bright screen image is the first exposure time.

S204, the exposure parameter is set as an exposure parameter 1, the exposure parameter 1 may include a second exposure time.

The first exposure time and the second exposure time are the same or different.

S205, dimmed screen image acquisition is performed under the exposure parameter 1.

For instance, a dimmed screen image 1, a dimmed screen image 2, . . . , and a dimmed screen image N are acquired, where $N \geq 1$. An exposure time of each of N dimmed screen images is the second exposure time, and the N dimmed screen images here correspond to the at least one second fingerprint image described above.

It should be understood that, in the embodiment of the present application, S204 and S205 may be executed before S202 and S203, i.e., the dimmed screen image may be acquired before the bright screen image.

In S206, the N dimmed screen images are averaged to obtain an average value image.

The average value image here corresponds to the fifth fingerprint image described above.

In S207, a calibration factor is determined according to the exposure parameter 0 and the exposure parameter 1.

For instance, the calibration factor may be a ratio between the first exposure time and the second exposure time.

In S208, exposure parameter calibration is performed on the average value image according to the calibration factor to obtain an interference image.

The interference image here corresponds to the third fingerprint image described above, for example, a fingerprint image obtained by multiplying the average value image by a calibration factor may be determined as the interference image.

In S209, interference cancellation is performed on the bright screen image according to the interference image to obtain a fingerprint image after removal of the interference image, i.e., the fourth fingerprint image described above.

For example, a difference image by subtracting the interference image from the bright screen image may be determined as the fourth fingerprint image.

As shown in FIG. 4, a method 300 for acquiring a fingerprint of an embodiment of the present application may include S301~S306; the specific executing process of S301~S303 is similar with that of S201~S203 in the method 200, which will not be repeated redundantly herein.

In S304, N groups of exposure parameters, such as an exposure parameter 1 to an exposure parameter N, are set. Each group of exposure parameter corresponds to an exposure time different from other groups; N dimmed screen images, such as a dimmed screen image 1, a dimmed screen image 2, . . . , a dimmed screen image N, where N≥1, are acquired under the N groups of exposure parameters.

In S305, an interference image having a same exposure time as the bright screen image is determined according to the acquired N dimmed screen images.

For example, the interference image having the same exposure time as the bright screen image may be determined by adopting the manner of interpolating or fitting.

Further, in S306, interference cancellation is performed on the bright screen image according to the determined interference image in S305 to obtain a fingerprint image after removal of the interference image.

For example, a difference image by subtracting the interference image from the bright screen image may be determined as the fourth fingerprint image.

Optionally, the fingerprint image after interference removal, i.e., the fourth fingerprint image, may be used for subsequent operations such as identifying a fingerprint, measuring a humidity, or dividing a pressed area, and an application scenario of the fourth fingerprint image is not particularly limited in the embodiment of the present application.

Figure 5:
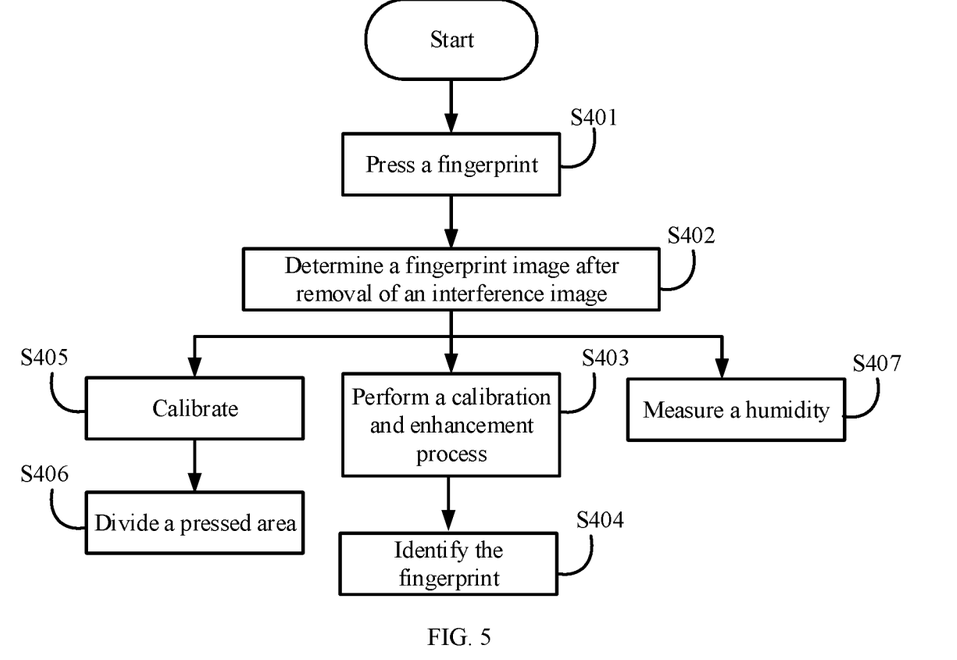
FIG. 5 is a flowchart of a subsequent operation of a method for acquiring a fingerprint according to an embodiment of the present application.

FIG. 5 is a schematic flowchart of a subsequent operation of a method for acquiring a fingerprint of an embodiment of the present application.

S401 in FIG. 5 may correspond to S201 in the method 200 shown in FIG. 3 and S301 in the method 300 shown in FIG. 4, which will not be repeated redundantly herein.

In S402, a fingerprint image after removal of an interference image is determined.

In particular, the executing process of S402 may refer to the relevant description of the foregoing embodiments, which will not be repeated redundantly herein.

An application scenario 1:

In S403, the fingerprint image obtained in S402 may be further processed, for example, a calibration and enhancement process as well as other operations may be performed on the fingerprint image.

In S404, the processed fingerprint image is input to a fingerprint identification module to perform fingerprint identification or fingerprint registration.

That is, the fourth fingerprint image after interference removal may be acquired according to the method for acquiring the fingerprint of the embodiment of the present application; since the fourth fingerprint image is closer to the real fingerprint image with respect to the first fingerprint image, performing the fingerprint identification according to the fourth fingerprint image is conducive to improving the security of the fingerprint identification system.

An application scenario 2:

In S405, the fingerprint image after removal of the interference image may be further processed, for example, the fingerprint image may be calibrated to exclude the influence of the uneven distribution of the brightness of the excitation light source or other factors on the fingerprint image.

Further, in S406, a division of a pressed area is performed on the processed fingerprint image.

For instance, the division of the pressed area may be performed according to a certain threshold value, and the pressed area may be divided into an area including fingerprint information and an area excluding the fingerprint information. Since the fingerprint image is not affected by the ambient light, dark current, temperature and other factors, performing an area division according to the fingerprint image is conducive to improving the accuracy and robustness of the area division.

An application scenario 3:

In S407, a humidity measurement is performed according to the fingerprint image after removal of the interference image.

In particular, the fingerprint image after removal of the interference image may be input to a humidity measuring module; since the fingerprint image is not affected by the ambient light, dark current, temperature and other factors, performing the humidity measurement according to the fingerprint image is conducive to improving the accuracy of the humidity measurement.

Therefore, in the method for acquiring the fingerprint of the embodiment of the present application, under a same interference condition, a bright screen image and at least one dimmed screen image are acquired, and an interference image having a same exposure time as the bright screen image is determined according to the at least one dimmed screen image. Since the first fingerprint image and the interference image include a same or similar interference image component, performing an interference cancellation on the bright screen image according to the interference image is conducive to reducing the effect of the ambient light, dark current, temperature and other factors on the fingerprint image.

Method embodiments of the present application are described in detail with reference to FIGS. 2 to 5 above, and apparatus embodiments of the present application will be described in detail with reference to FIGS. 6 to 7 below. It should be understood that, the apparatus embodiments correspond to the method embodiments, and the similar description may refer to the method embodiments.

Figure 6:
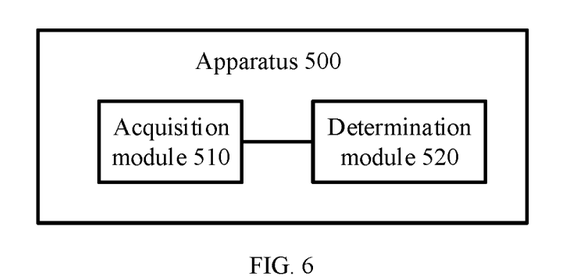
FIG. 6 is a schematic block diagram of an apparatus for acquiring a fingerprint according to an embodiment of the present application.

FIG. 6 is a schematic block diagram of an apparatus 500 for acquiring a fingerprint according to an embodiment of the present application. As shown in FIG. 6, the apparatus 500 includes:

an acquisition module 510, configured to acquire a first fingerprint image and at least one second fingerprint image, where a screen luminance for acquiring the first fingerprint image is higher than a screen luminance for acquiring the at least one second fingerprint image; and a determination module 520, configured to determine a third fingerprint image according to the first fingerprint image and the at least one second fingerprint image, and perform an interference cancellation on the first fingerprint image according to the third fingerprint image to obtain a fourth fingerprint image, where the third fingerprint image is an interference image having a same exposure time as the first fingerprint image.

Optionally, in some embodiments, the acquisition module 510 is configured to:

acquire the first fingerprint image under a first exposure parameter; and acquire the at least one second fingerprint image under a second exposure parameter;

where the first exposure parameter includes a first exposure time, and the second exposure parameter includes a second exposure time.

Optionally, in some embodiments, the determination module 520 is configured to:

average the at least one second fingerprint image to obtain a fifth fingerprint image; and determine the third fingerprint image according to exposure parameters of the first fingerprint image and the fifth fingerprint image.

Optionally, in some embodiments, the determination module 520 is further configured to:

determine the fifth fingerprint image as the third fingerprint image if the first exposure time and the second exposure time are the same; or determine a fingerprint image obtained by multiplying the fifth fingerprint image by a calibration factor and subtracting a specific offset image as the third fingerprint image if the first exposure time and the second exposure time are different, where the calibration factor is determined according to the first exposure parameter and the second exposure parameter.

Optionally, in some embodiments, a pixel value of each pixel point in the specific offset image is zero.

Optionally, in some embodiments, the calibration factor is a ratio between the first exposure time and the second exposure time.

Optionally, in some embodiments, the acquisition module 510 is further configured to:

acquire the first fingerprint image under a first exposure parameter; and acquire the at least one second fingerprint image under at least one second exposure parameter;

where each of the at least one second exposure parameter corresponds a respective one of the at least one second fingerprint image.

Optionally, in some embodiments, the determination module 520 is configured to:

perform an interpolating or fitting process on the at least one second fingerprint image to obtain the third fingerprint image having the same exposure time as the first fingerprint image.

Optionally, in some embodiments, the at least one second fingerprint image includes a second fingerprint image, and the determination module 520 is configured to:

determine the second fingerprint image as the third fingerprint image if the first fingerprint image and the second fingerprint image have a same exposure time; or determine a fingerprint image obtained by multiplying the second fingerprint image by a calibration factor and subtracting a specific offset image as the third fingerprint image if the first fingerprint image and the second fingerprint image have a different exposure time, where the calibration factor is determined according to the exposure parameters of the first fingerprint image and the second fingerprint image.

Optionally, in some embodiments, the apparatus 500 further includes:

a processing module, configured to identify a fingerprint, measure a humidity, or divide a pressed area according to the fourth fingerprint image.

Figure 7:
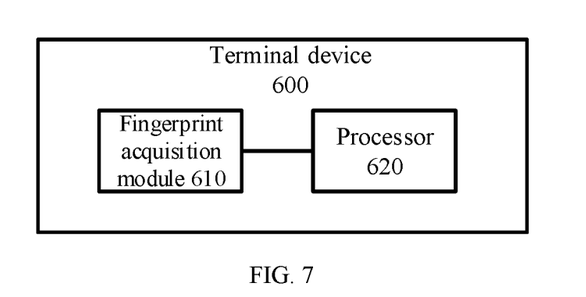
FIG. 7 is a schematic block diagram of a terminal device according to an embodiment of the present application.

As shown in FIG. 7, a terminal device 600 is further provided in an embodiment of the present application. The terminal device 600 may be the apparatus 500 in FIG. 6, and it may be configured to execute contents in the method embodiments of FIGS. 2 to 5. The terminal device 600 includes: a fingerprint acquisition module 610 and a processor 620.

The fingerprint acquisition module 610 and the processor 620 communicate with each other through an internal connection path. The fingerprint acquisition module 610 is configured to acquire the first fingerprint image and the at least one second fingerprint image. The processor 620 is configured to determine a third fingerprint image according to the first fingerprint image and the at least one second fingerprint image, and perform interference cancellation on the first fingerprint image according to the third fingerprint image to obtain a fourth fingerprint image.

In particular, the fingerprint acquisition module 610 may correspond to the acquisition module 510 in the apparatus 500 of the embodiment of the present application, and the processor 620 may correspond to the determination module 520 and the processing module in the apparatus 500 of the embodiment of the present application. For brevity, it is not repeated redundantly herein.

It should be understood that, the processor 620 of the embodiment of the present application may be an integrated circuit chip with signal processing capacity. In an implementation process, each step of the above-mentioned method embodiments may be completed by an integrated logic circuit of hardware or instructions in a software form in the processor. The above-mentioned processor may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or a transistor logic device and a discrete hardware component. Each method, step and logical block diagram disclosed in the embodiment of the present application may be implemented or performed. The general-purpose processor may be a microprocessor or the processor may be any conventional processor, etc. The steps of the method disclosed in the embodiment of the present application may be directly executed and completed by a hardware decoding processor, or is executed and completed by a combination of hardware and software modules in the decoding processor. The software module may be located in a mature storage media in the art, such as a random access memory, a flash memory, a read-only memory, a programmable read-only memory or an electrically erasable programmable memory, or a register. The storage medium is positioned in a memory, and a processor is used for reading information in the memory and completing the steps included in the aforementioned methods in combination with hardware thereof It is appreciated that, the terminal device 600 in an embodiment of the present application may further include a memory; the memory may be either volatile memory or nonvolatile memory, or may include both volatile and nonvolatile memory. The nonvolatile memory may be a read-only memory (Read-Only Memory, ROM), a programmable ROM (Programmable ROM, PROM), an erasable PROM (Erasable PROM, EPROM), an electrically EPROM (Erasable PROM, EPROM) or a flash memory. The volatile memory may be a random access memory (Random Access Memory, RAM), which acts as external cache memory. By way of example, and not limitation, many forms of RAM are available, such as a static RAM (Static RAM, SRAM), a dynamic RAM (Dynamic RAM, DRAM), a synchronous DRAM (Synchronous DRAM, SDRAM), a double data rate SDRAM (Double Data Rate SDRAM, DDR SDRAM), an enhanced SDRAM (Enhanced SDRAM, ESDRAM), a synchlink DRAM (Synchlink DRAM, SLDRAM) and a direct rambus RAM (Direct Rambus RAM, DR RAM). It is to be noted that, the memory of the system and method described herein is intended to include, without being limited to, these and any other suitable types of memory.

A computer readable storage medium is further provided in an embodiment of the present application. The computer readable storage medium stores one or more programs. The one or more programs include instructions which, when executed by a portable electronic device including a plurality of applications, may cause the portable electronic device to execute the embodiment methods illustrated in FIGS. 2 to 5.

A computer program is further provided in an embodiment of the present application. The computer program includes instructions, and when the computer program is executed by a computer, the computer may execute the embodiment methods illustrated in FIGS. 2 to 5.

A chip is further provided in an embodiment of the present application. The chip includes an input/output interface, at least one processor, at least one memory and a bus. The at least one memory is configured to store an instruction. The at least one processor is configured to call the instruction in the at least one memory, to execute the embodiment methods illustrated in FIGS. 2 to 5.

It should be understood that, in various embodiments of the present application, values of sequence numbers of the above-mentioned various processes do not mean an order of execution which should be determined based upon functionalities and internal logics thereof, rather than setting any limitation to implementation of the embodiment of the present application.

Those of ordinary skill in the art may be aware that, units and algorithm steps of the examples described in the embodiments disclosed in this paper may be implemented by electronic hardware, computer software, or a combination of the two. Whether these functions are executed in hardware or software mode depends on the specific applications and design constraint conditions of the technical solution. Those skilled may implement the described functions by using different methods for each specific application, but this implementation should not be considered to be beyond the scope of the present application.

Those skilled in the art to which the present application pertains may clearly understand that, for the convenience and simplicity of description, for the specific working processes of the system, the apparatus and the units described above, may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the embodiments of the present application may be integrated in a processing unit, or the respective units exist separately and physically, or two or more units are integrated in one unit.

When the functions are implemented in the form of software functional units and sold or used as independent products, the functions may be stored in a computer readable storage medium. Based on such understanding, the technical solution of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The preceding storage medium includes various kinds of medium that may store program codes, such as a U disk, a removable hard disk, a read-only memory (Read-Only Memory, ROM), a random access memory (Random Access Memory, RAM), a magnetic disk, an optical disk, or the like.

Described above are the specific embodiments of the present application only, but the protection scope of the present application is not limited to this, those skilled who are familiar with the art could readily think of variations or substitutions within the technical scope disclosed by the present application, and these variations or substitutions shall fall within the protection scope of the present application. Therefore, the protection scope of the present application should be determined with reference to the protection scope of the claims.

What is claimed is:

1. A method for acquiring a fingerprint, applied to a terminal device comprising a screen and an imaging sensor, and the imaging sensor is disposed in part of an area below the screen, a fingerprint detection area of the imaging sensor is located in part of a display area of the screen to implement under-display optical fingerprint detection, comprising:

acquiring a first fingerprint image under a first exposure parameter and at least one second fingerprint image under at least one second exposure parameter through the imaging sensor, wherein a screen luminance for acquiring the first fingerprint image is higher than a screen luminance for acquiring the at least one second fingerprint image;

determining a third fingerprint image according to the at least one second fingerprint image, and a relationship between the first exposure parameter and the at least one second exposure parameter, wherein the third fingerprint image is an interference image having a same exposure time as the first fingerprint image; and performing interference cancellation on the first fingerprint image according to the third fingerprint image to obtain a fourth fingerprint image.

2. The method according to claim 1, wherein the at least one second exposure parameter comprises a second exposure parameter, and the second exposure parameter comprises a second exposure time.

3. The method according to claim 2, wherein the determining the third fingerprint image according to the at least one second fingerprint image, and the relationship between the first exposure parameter and the at least one second exposure parameter, comprises:

averaging the at least one second fingerprint image to obtain a fifth fingerprint image; and determining the third fingerprint image according to exposure parameters of the first fingerprint image and the fifth fingerprint image.

4. The method according to claim 3, wherein the determining the third fingerprint image according to exposure parameters of the first fingerprint image and the fifth fingerprint image comprises:

determining the fifth fingerprint image as the third fingerprint image if the first exposure time and the second exposure time are the same; or determining a fingerprint image obtained by multiplying the fifth fingerprint image by a calibration factor and subtracting a specific offset image as the third fingerprint image if the first exposure time and the second exposure time are different, wherein the calibration factor is determined according to the first exposure parameter and the second exposure parameter.

5. The method according to claim 4, wherein a pixel value of each pixel point in the specific offset image is zero.

6. The method according to claim 4, wherein the calibration factor is a ratio between the first exposure time and the second exposure time.

7. The method according to claim 1, wherein the at least one second exposure parameter comprises multiple second exposure parameters, the at least one second fingerprint image comprises multiple second fingerprint images, and each of the multiple second exposure parameter corresponds to a respective one of the multiple second fingerprint images.

8. The method according to claim 7, wherein the determining the third fingerprint image according to the at least one second fingerprint image, and the relationship between the first exposure parameter and the at least one second exposure parameter, comprises:

performing an interpolating or fitting process on the multiple second fingerprint image to obtain the third fingerprint image having the same exposure time as the first fingerprint image.

9. The method according to claim 1, wherein the at least one second fingerprint image comprises a second fingerprint image, and the determining the third fingerprint image according to the at least one second fingerprint image, and the relationship between the first exposure parameter and the at least one second exposure parameter, comprises:

determining the second fingerprint image as the third fingerprint image if the first fingerprint image and the second fingerprint image have a same exposure time; or determining a fingerprint image obtained by multiplying the second fingerprint image by a calibration factor and subtracting a specific offset image as the third fingerprint image if the first fingerprint image and the second fingerprint image have different exposure time, wherein the calibration factor is determined according to the exposure parameters of the first fingerprint image and the second fingerprint image.

10. The method according to claim 9, wherein the method further comprises:

identifying a fingerprint, measuring a humidity, or dividing a pressed area according to the fourth fingerprint image.

11. An apparatus for acquiring a fingerprint, comprising:

an imaging sensor, disposed in part of an area below a screen, a fingerprint detection area of the imaging sensor is located in part of a display area of the screen to implement under-display optical fingerprint detection, wherein the imaging sensor is configured to acquire a first fingerprint image under a first exposure parameter and at least one second fingerprint image under at least one second exposure parameter, wherein a screen luminance for acquiring the first fingerprint image is higher than a screen luminance for acquiring the at least one second fingerprint image; and a processor, configured to determine a third fingerprint image according to the at least one second fingerprint image and a relationship between the first exposure parameter and the at least one second exposure parameter, and perform interference cancellation on the first fingerprint image according to the third fingerprint image to obtain a fourth fingerprint image, wherein the third fingerprint image is an interference image having a same exposure time as the first fingerprint image.

12. The apparatus according to claim 11, wherein the at least one second exposure parameter comprises a second exposure parameter, and the second exposure parameter comprises a second exposure time.

13. The apparatus according to claim 11, wherein the processor is configured to:

average the at least one second fingerprint image to obtain a fifth fingerprint image; and determine the third fingerprint image according to exposure parameters of the first fingerprint image and the fifth fingerprint image.

14. The apparatus according to claim 13, wherein the processor is further configured to:

determine the fifth fingerprint image as the third fingerprint image if the first exposure time and the second exposure time are the same; or determine a fingerprint image obtained by multiplying the fifth fingerprint image by a calibration factor and subtracting a specific offset image as the third fingerprint image if the first exposure time and the second exposure time are different, wherein the calibration factor is determined according to the first exposure parameter and the second exposure parameter.

15. The apparatus according to claim 14, wherein a pixel value of each pixel point in the specific offset image is zero.

16. The apparatus according to claim 14, wherein the calibration factor is a ratio between the first exposure time and the second exposure time.

17. The apparatus according to claim 11,
wherein the at least one second exposure parameter comprises multiple second exposure parameters, the at least one second fingerprint image comprises multiple second fingerprint images, and each of the multiple second exposure parameters corresponds to a respective one of the multiple second fingerprint images.

18. The apparatus according to claim 17, wherein the processor is configured to:
perform an interpolating or fitting process on the multiple e second fingerprint image to obtain the third fingerprint image having the same exposure time as the first fingerprint image.

19. The apparatus according to claim 11, wherein the at least one second fingerprint image comprises a second fingerprint image, and the processor is configured to:
determine the second fingerprint image as the third fingerprint image if the first fingerprint image and the second fingerprint image have a same exposure time; or
determine a fingerprint image obtained by multiplying the second fingerprint image by a calibration factor and subtracting a specific offset image as the third fingerprint image if the first fingerprint image and the second fingerprint image have a different exposure time, wherein the calibration factor is determined according to the exposure parameters of the first fingerprint image and the second fingerprint image.

20. A terminal device, comprising:
a screen
an imaging sensor, disposed in part of an area below the screen, a fingerprint detection area of the imaging sensor is located in part of a display area of the screen to implement under-display optical fingerprint detection, wherein the imaging sensor is configured to acquire a first fingerprint image under a first exposure parameter and at least one second fingerprint image under at least one second exposure parameter, wherein a screen luminance for acquiring the first fingerprint image is higher than a screen luminance for acquiring the at least one second fingerprint image;
a processor configured to implement a method comprising:
determining a third fingerprint image according to the at least one second fingerprint image, and a relationship between the first exposure parameter and the at least one second exposure parameter, wherein the third fingerprint image is an interference image having a same exposure parameter as the first fingerprint image; and
performing interference cancellation on the first fingerprint image according to the third fingerprint image.

* * * * *